(12) United States Patent
Vanti

(10) Patent No.: US 10,793,177 B2
(45) Date of Patent: Oct. 6, 2020

(54) MULTIMEDIA OPERATING STATION FOR AUTOMATIC MACHINE OPERATORS

(71) Applicant: I.M.A. INDUSTRIA MACCHINE AUTOMATICHE S.p.A., Ozzano Dell'Emilia (Bologna) (IT)

(72) Inventor: Pier Luigi Vanti, Ozzano Dell'Emilia (IT)

(73) Assignee: I.M.A. INDUSTRIA MACCHINE AUTOMATICHE S.P.A., Ozzano Dell'Emilia (IT)

(*) Notice: Subject to any disclaimer, the term of this patent is extended or adjusted under 35 U.S.C. 154(b) by 0 days.

(21) Appl. No.: 16/386,944

(22) Filed: Apr. 17, 2019

(65) Prior Publication Data

US 2019/0347060 A1 Nov. 14, 2019

(30) Foreign Application Priority Data

May 9, 2018 (IT) .................. 202018000002504

(51) Int. Cl.
*B62B 3/14* (2006.01)
*G06F 3/14* (2006.01)
(Continued)

(52) U.S. Cl.
CPC .............. *B62B 3/1412* (2013.01); *B62B 3/10* (2013.01); *G06F 3/147* (2013.01); *G09G 5/006* (2013.01); *G09G 2354/00* (2013.01)

(58) Field of Classification Search
CPC .. B66F 9/0759; B66F 9/127; B60K 2370/152; B60K 2370/155; B60K 2370/52; B64F 5/10; B64F 5/00; B64F 5/50; B64F 5/60; B62B 2202/56; B62B 3/002; B62B 3/10; A61G 12/001; G06F 3/147; G06F 15/00; G09G 5/006; G09G 2354/00; F16M 11/22; F16M 11/42; F16M 11/046; G16Z 99/00; G09B 19/24

See application file for complete search history.

(56) References Cited

U.S. PATENT DOCUMENTS 5,630,566 A * 5/1997 Case .................... A47B 23/046
248/122.1
6,915,155 B2 * 7/2005 Surwillo .............. A61B 5/0402
600/450

(Continued)

*Primary Examiner* — Darlene M Ritchie
(74) *Attorney, Agent, or Firm* — Shuttleworth & Ingersoll, PLC; Timothy J. Klima

(57) ABSTRACT

A multimedia operating station for automatic machine operators including a carriage movable on wheels on a treadable surface and supporting a vertical frame having a first, lower, portion, and a second, upper, portion; a screen for displaying graphics and data associated with the second portion of the frame; a unit for processing graphics and data relating to the components and to the operating systems of the automatic machine and positioned on the first portion of the frame and connected to the screen; a device for introducing commands to the unit for processing graphics and data positioned on the first portion of the frame and connected to the unit for processing graphics and data; an autonomous electricity supply unit positioned in the first portion of the frame and powering at least the screen and the processing unit.

11 Claims, 4 Drawing Sheets

(51) Int. Cl.
  *B62B 3/10* (2006.01)
  *G09G 5/00* (2006.01)
  *G06F 3/147* (2006.01)

(56) References Cited

U.S. PATENT DOCUMENTS

| | | | | |
|---|---|---|---|---|
| 8,286,977 | B2* | 10/2012 | Butler | A61G 12/001 |
| | | | | 280/47.34 |
| 2003/0052787 | A1* | 3/2003 | Zerhusen | G16H 20/13 |
| | | | | 340/573.1 |
| 2006/0125356 | A1* | 6/2006 | Meek, Jr. | G16H 20/13 |
| | | | | 312/215 |
| 2007/0185390 | A1* | 8/2007 | Perkins | A61B 5/0002 |
| | | | | 600/300 |
| 2011/0140381 | A1* | 6/2011 | Rossini | A61G 12/001 |
| | | | | 280/43.23 |
| 2012/0013464 | A1* | 1/2012 | Roberts | A61G 12/001 |
| | | | | 340/541 |
| 2013/0200579 | A1* | 8/2013 | Abernethy | B62B 3/001 |
| | | | | 280/6.15 |
| 2014/0009561 | A1* | 1/2014 | Sutherland | F16M 11/42 |
| | | | | 348/14.05 |
| 2014/0265193 | A1* | 9/2014 | Stark | B62B 3/10 |
| | | | | 280/47.34 |
| 2015/0105660 | A1* | 4/2015 | Ninomiya | B62B 3/02 |
| | | | | 600/437 |
| 2015/0223892 | A1* | 8/2015 | Miller | A61B 50/15 |
| | | | | 345/174 |
| 2015/0298717 | A1* | 10/2015 | Uttley | B62B 3/022 |
| | | | | 280/651 |
| 2016/0207554 | A1* | 7/2016 | Johnson | B62B 3/008 |
| 2016/0272232 | A1* | 9/2016 | Huguet | B62B 5/065 |
| 2017/0031386 | A1* | 2/2017 | Engel | G06F 3/1446 |

* cited by examiner

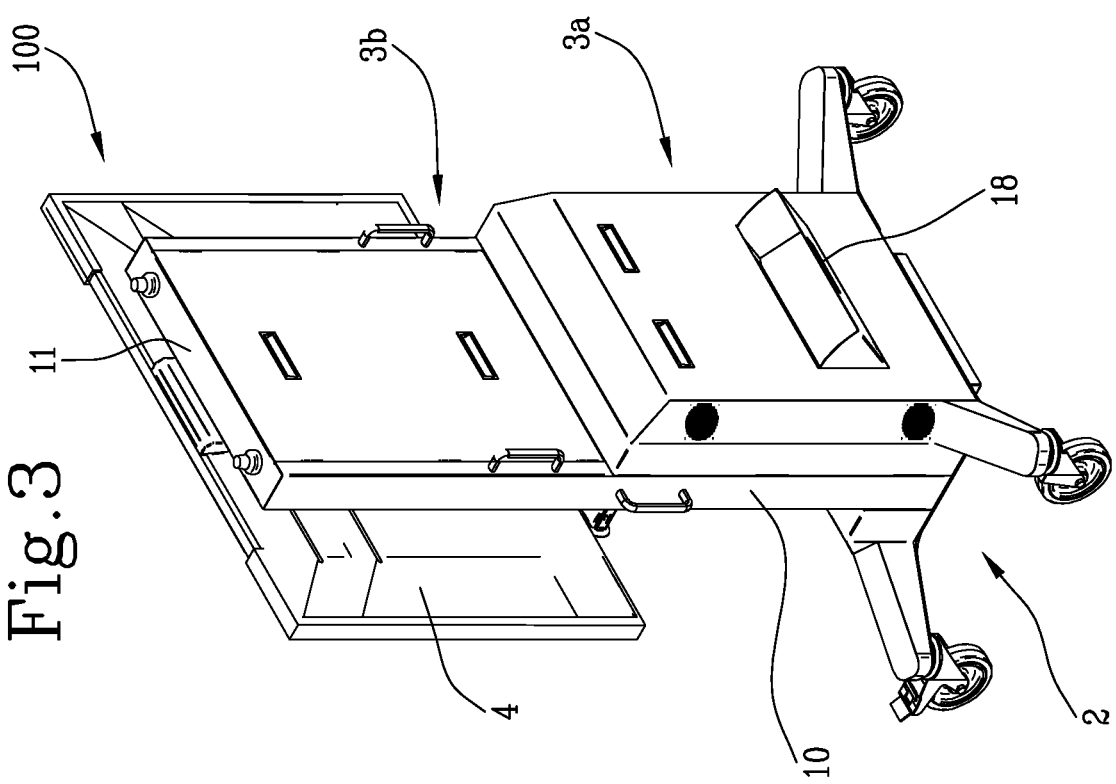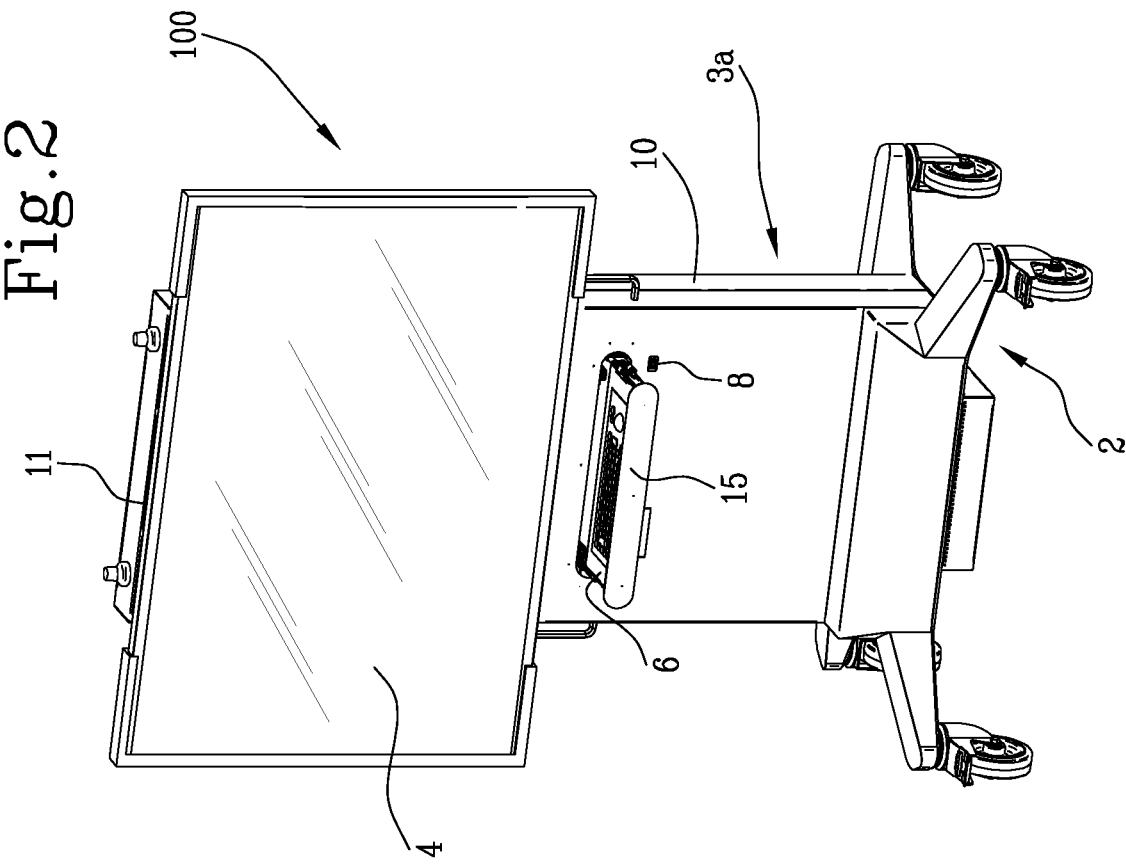

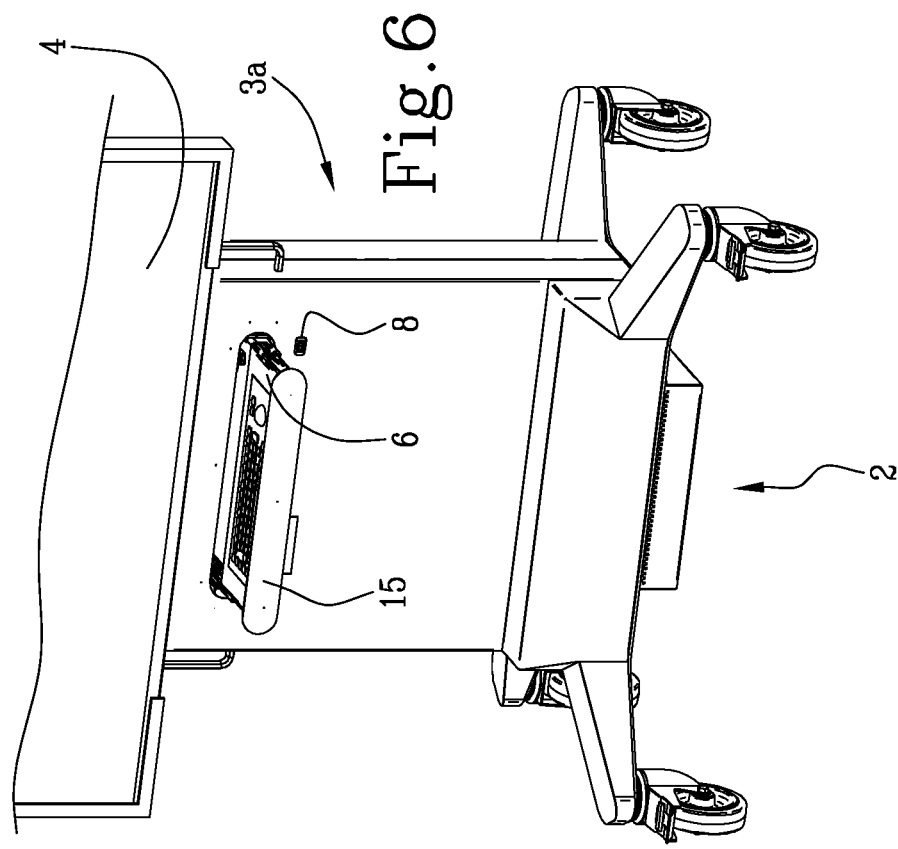
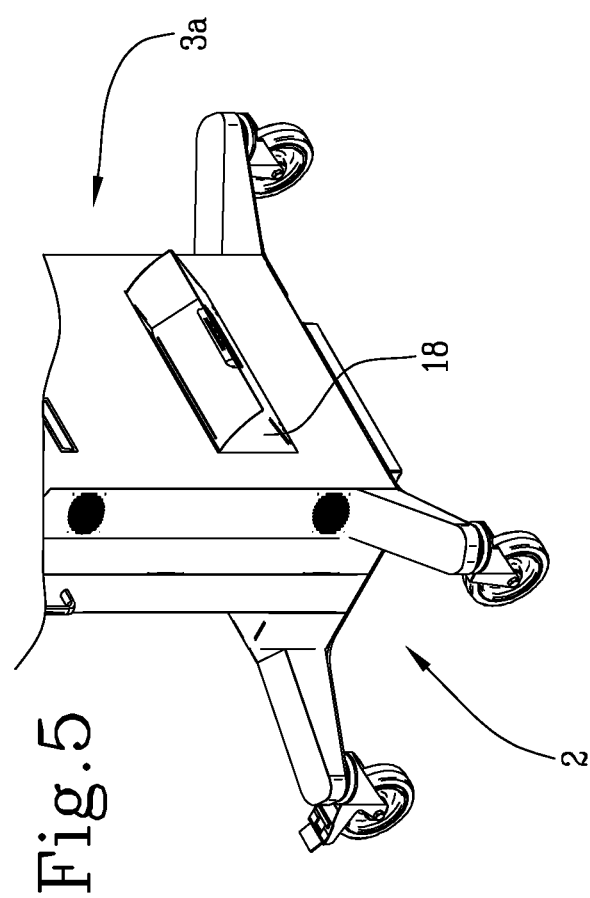
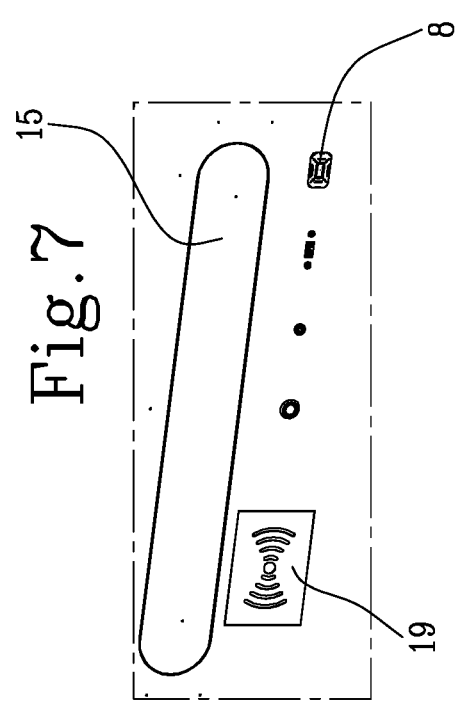

MULTIMEDIA OPERATING STATION FOR AUTOMATIC MACHINE OPERATORS

This application claims priority to Italian Patent Application 202018000002504 filed May 9, 2018, the entirety of which is incorporated by reference herein.

BACKGROUND OF THE INVENTION

This invention relates to a multimedia operating station for automatic machine operators.

Currently, automatic machines, such as machines for making filter bags with infusion products, machines for producing pharmaceutical products, etc. have an increasingly greater constructional complexity in which mechanical, electrical, optical and IT systems interact with each other.

For this reason, the technicians responsible for their assembly, maintenance and control must always have available documentation which is very bulky (usually a paper copy).

In particular, the technician(s) responsible for assembling the machine (or after assembly, during machine testing) must constantly check whether the steps for assembling the components are consistent with that indicated on the drawings prepared by the technical department.

However, it is not always possible to provide this documentation in the vicinity of the automatic machine to be assembled or inspected, also considering the fact that many of these drawings are prepared on very large sheets.

The technician can therefore prepare the documentation necessary for the operations for assembly or correction/addition to the machine in a zone relatively far from the machine.

This factor often results in the technician having to continuously move away from the machine to be able to check on the drawings the correct steps for the assembly or correction/addition to the operations on the machine, with a considerable inconvenience for the technician.

In addition, during the steps for installing the machine, the technician must often put away and then unfurl various hard copy documents relative to various assembly drawings, with a consequent increase in the machine activation times.

SUMMARY OF THE INVENTION

The aim of the invention is to provide a multimedia operating station for automatic machine operators which is able to overcome the above-mentioned drawbacks.

In particular, the aim of the invention is to provide a multimedia operating station for automatic machine operators which is able to support the operator with all the graphical documentation and data necessary for the operations and which can be located in the proximity of the machine.

A further aim of the invention is to provide a multimedia operating station for automatic machine operators which is able to store and display all the necessary machine diagrams in a fast and precise manner.

Said aims are fully achieved by the multimedia operating station for automatic machine operators according to the invention as characterized in the appended claims.

BRIEF DESCRIPTION OF DRAWINGS

The features of the invention will become more apparent from the following detailed description of a preferred, non-limiting embodiment of it, illustrated by way of example in the accompanying drawings, in which:

FIGS. 2 and 3 illustrate, respectively, front and rear perspective views of the multimedia operating station of FIG. 1;

FIG. 5 illustrates a rear perspective view of a detail of the lower part of the multimedia operating station;

FIG. 6 illustrates a front perspective view of a detail of the lower part of the multimedia operating station;

FIG. 7 illustrates an enlarged detail of FIG. 6.

DESCRIPTION OF PREFERRED EMBODIMENTS

Figure 1:
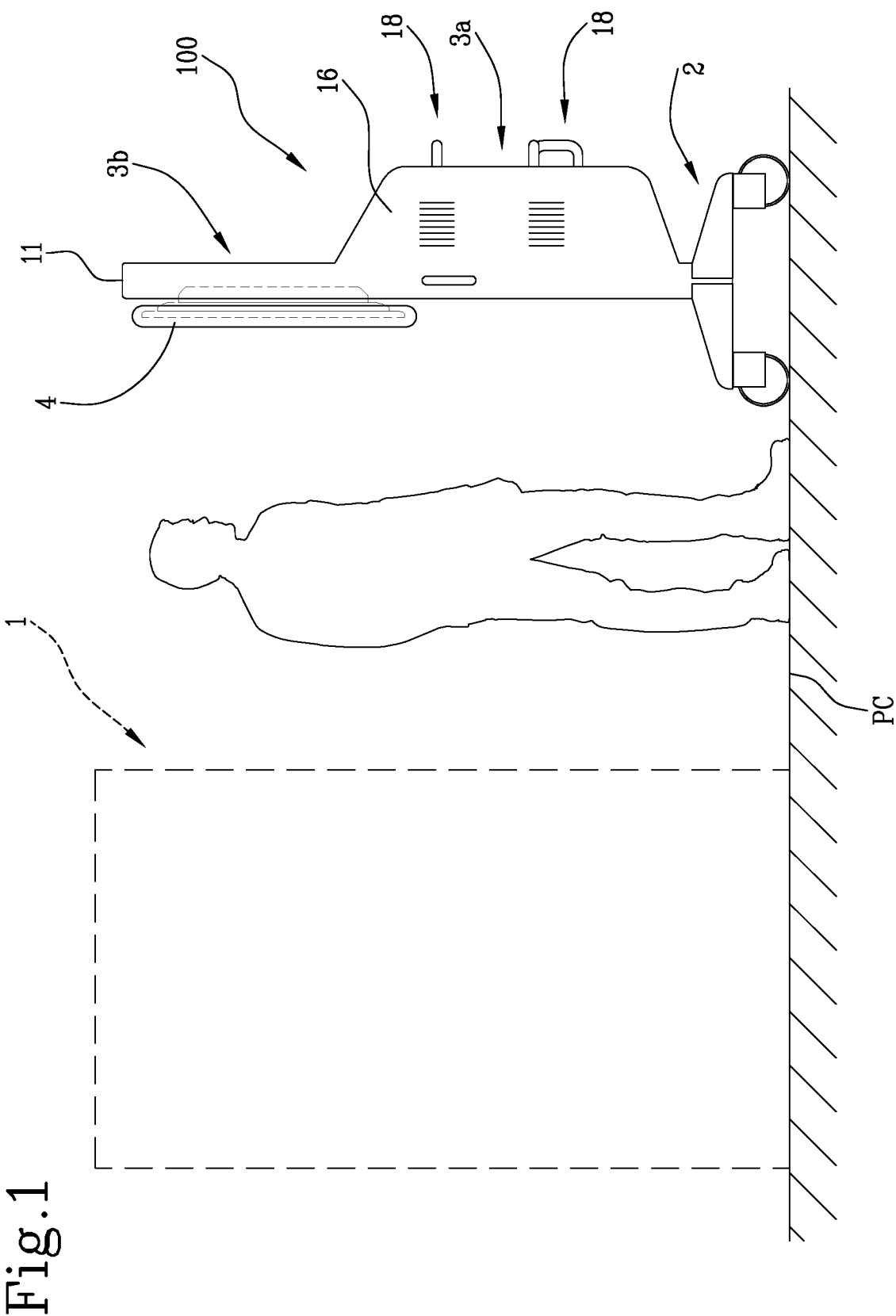
FIG. 1 illustrates a schematic side view of a multimedia operating station, according to the invention, positioned in the proximity of an automatic machine.

With reference to the accompanying drawings, and with particular reference to FIGS. 1 to 3, the multimedia operating station according to the invention, labelled 100 in its entirety, provides assistance to the assembly technicians, during operational tests and during the setting up/adjustment of automatic machines (such as, for example, automatic machines for making filter bags with infusion products, automatic machines for preparing pharmaceutical products, etc.).

It should be noted that FIG. 1 illustrates, with a block labelled 1, a generic automatic machine by way of example.

The multimedia operating station 100 comprises a carriage 2, which is movable on a treadable surface PC and supporting a vertical frame having a first, lower, portion 3a, and a second, upper, portion 3b.

The multimedia operating station 100 also comprises a screen 4 for displaying graphical and alphanumeric data associated with the second portion 3b of the frame.

Moreover, the multimedia operating station 100 comprises a graphical and alphanumeric data processing unit 5 relative to the components and to the operating systems of the automatic machine 1.

The processing unit 5 is positioned on the first portion 3a of the frame and connected to the screen 4.

The multimedia operating station 100 also comprises a device 6 for introducing commands to the processing unit 5 positioned on the first portion 3a of the frame and connected to the same processing unit 5.

The multimedia operating station 100 also comprises an autonomous electricity supply unit 7 positioned in the first portion 3a of the frame and powering at least the screen 4 and the processing unit 5.

The multimedia operating station structured in this way allows the technicians to have in the proximity of the automatic machine to be assembled or modified, or, also, to be started up or adjusted during operation, a display and processing of the drawings of the automatic machine in a position close to the machine. Position which may be modified by easily moving the operating station.

Preferably, the operating station 100 comprises a connecting device 8 for an external data memory unit (not illustrated) positioned on the first portion 3a of the frame and connected to the graphical and data processing unit 5.

According to a non-limiting example, the connecting device 8 may be (see FIG. 7) a connector for a Flash USB data storage unit. In this way, the data of the automatic machine can be modified or updated on the basis of upgrades provided to the operator.

According to an alternative embodiment, the screen 4 for displaying graphical and alphanumeric data comprises, alternatively or complementarily, at least a functional part of the device 6 for introducing commands to the processing unit 5.

In light of this, the screen 4 is of the 'touch-screen' type. In this way, the screen becomes to all intents and purposes part of the control logic, allowing the operator, through predetermined movements of the hand and touches to activate applications installed in the processing unit 5. With this system, the technician can, for example, open and close drawings and technical diagrams stored in the processing unit, make modifications to the viewing of the diagrams, in particular for the rotation, enlargement, technical representation (for example, three-dimensional of the units or sub-units being assembled which are being operated on).

It should be noted that the carriage 2 is equipped with a plurality of wheels freely rotatable on the relative vertical axis of articulation and, preferably, provided with locking means for their stabilization in the position decided by the technician (see also FIGS. 5 and 6).

Figure 4:
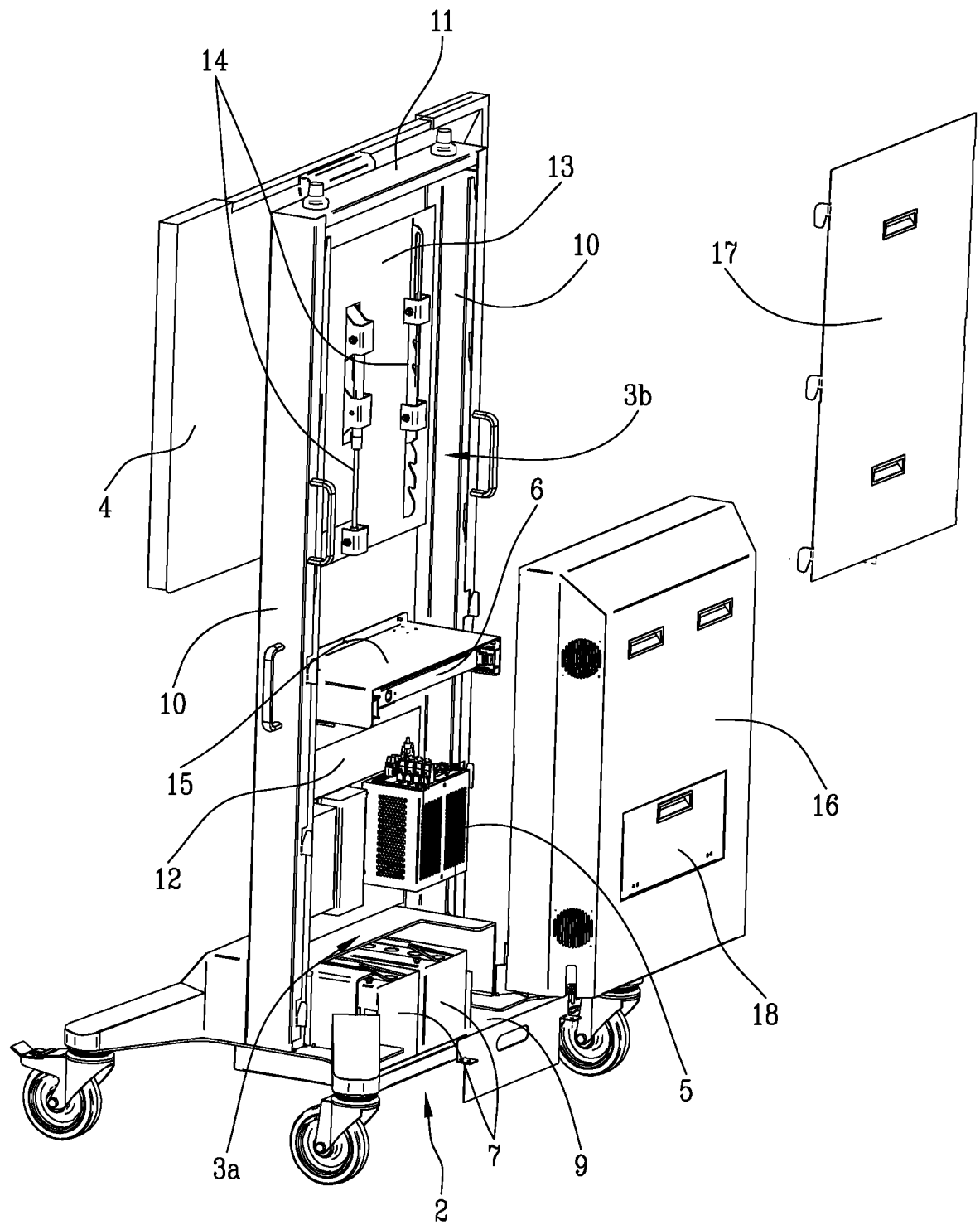
FIG. 4 illustrates a partly exploded rear perspective view of the multimedia operating station of the above-mentioned drawings.

Preferably (see also FIG. 4), the frame has a main rigid core formed by a base 9, integral with the mobile carriage 2, two uprights 10 and an upper transversal member 11 rigidly connected to each other to define a delimited space (or quadrangular internal space).

In light of this, inside the delimited space of the frame are positioned two equipped plates 12 and 13, vertical and independent from each other, defining a part of the first portion 3a and, respectively, the second portion 3b of the frame.

Also in light of this, the upper plate 13 defining the second portion 3b of the frame supports the screen 4.

The upper plate 13 also comprises guides 14 for supporting and vertically adjusting the screen, 4 positioned in the rear part of the upper plate 13. For this purpose, the upper plate 13 is equipped with slots for passage of the guides 14 to be able to connect directly to the screen 4.

Preferably, the base 9 of the frame, defining a part of the first portion 3a of the frame, supports the autonomous electricity supply unit 7.

It should be noted that the autonomous unit 7 comprises one or more batteries generating electricity and configured for being recharged when the operating station is not being used.

In addition, the batteries can be prepared with connections for the electricity mains supply if present in the vicinity of the working area.

In this way, the operating station can always be used and also in zones without electricity mains connections with a high level of safety for the operator.

The lower plate 12 has a first sector for supporting the processing unit 5 and a second sector or drawer 15 for supporting the device 6 for introducing commands.

The second sector or drawer 15 is equipped with guides sliding in both directions to allow the device 6 for introducing commands to transfer from a non-operating position, wherein the introducing device 6 is protected by the drawer 15 (FIGS. 1 and 4), to an operating position wherein the introducing device 6 is protruding from the drawer 15 and a front face of the frame (see FIGS. 2 and 6).

Preferably, the operating station 100 comprises at least one guard 16 associated with the frame for the rear cover for at least the processing unit 5 and the autonomous electricity supply unit 7.

In light of this, the guard 16 is configured to be able to be removed from the frame.

According to an alternative embodiment, the operating station 100 comprises at least two independent guards 16 and 17 for the cover of the first 3a and, respectively, the second 3b rear portion of the frame.

In light of this, the two guards 16 and 17 are configured so that they can be removed, independently of each other, from the frame.

It should also be noted that the lower guard 16 is equipped with at least one compartment 18 which can be opened for accessing the components covered by the lower guard 16.

As shown in FIG. 7, the operating station 100 comprises an electronic device 19 for detection and recognition of a user, even at a distance, provided with a suitable electronic key (not illustrated).

In light of this, the detection device 19 is positioned on the frame and connected to the data and graphical processing unit 5.

The detection device 19 allows the activation of the operating system only for authorized personnel and in such a way as to guarantee the safety of the data present in the processing unit.

Thanks to the multimedia operating station structured in this way the preset aims are achieved.

In particular, the possibility of having together inside a single station all the documentation necessary for the operations on the automatic machine (line assembly, management of operation programs, set of possible adjustments, electrical/electronic diagrams) and combined with the possibility of having all this in the proximity of the machine and able to be viewed in a fast and clear manner facilitates and speeds up the above-mentioned operations on the machine.

Moreover, the station, despite the dimensions and weight, has a high degree of mobility inside the assembly/maintenance zone of the automatic machine or of the line of automatic machines as a function of the requirements of the operators who may, therefore, move around with their multimedia the station.

This is also possible due to the fact that the carriage does not need supply connections/cables in order to operate and is therefore operationally independent both in terms of power supply and, if necessary, for connection to the company's data network or to other mobile devices supporting the "on time" operation. In addition, there is the security given by the fact that, having a single operating station, the material, which may even be confidential, on the machine cannot be freely viewed by third parties.

What is claimed is:

1. A multimedia operating station for operators of an automatic machine, comprising:
    a mobile carriage, which is movable on a treadable surface and supports a vertical frame including a lower, first portion, and an upper, second portion;
    a screen for displaying graphical and alphanumeric data connected to the second portion of the frame;
    a graphical and alphanumeric data processing unit for operative connection to at least one chosen from a component and to the operating system of the automatic machine; the processing unit being positioned on the first portion of the frame and connected to the screen;

a device for introducing commands to the processing unit positioned on the first portion of the frame and connected to the processing unit;

an autonomous electricity supply unit positioned in the first portion of the frame and powering the screen and the processing unit;

wherein the frame includes a main rigid core formed by a base, integral with the mobile carriage, two uprights and an upper transversal member rigidly connected to each other to define a delimited space; inside the delimited space of the frame being positioned two plates, vertical and independent from each other, to define a part of the first portion and, respectively, the second portion of the frame.

2. The station according to claim 1, and further comprising a connecting device for an external data memory unit positioned on the first portion of the frame and connected to the processing unit.

3. The station according to claim 1, wherein an upper one of the two plates, defining a portion of the second portion of the frame, supports the screen and comprises guides for supporting and vertically adjusting the screen positioned on a rear part of the upper one of the two plates.

4. The station according claim 1, wherein the base of the frame, defining a part of the first portion of the frame, supports the autonomous electricity supply unit.

5. The station according to claim 1, wherein a lower one of the two plates includes a first sector for supporting the processing unit and a second sector or drawer for supporting the device for introducing commands; the second sector or drawer including guides sliding in two directions, to allow the device for introducing commands to be transferred from a non-operating position, wherein the introducing device is protected by the second sector or drawer, to an operating position wherein the introducing device is protruding from the second sector or drawer and a front face of the frame.

6. The station according to claim 1, comprising a guard connected to the frame as a rear cover for the processing unit and the autonomous electricity supply unit; the guard being configured to allow removal from the frame.

7. The station according to claim 1, and further comprising an electronic detection device for detection and recognition of a user, even at a distance, the detection device including an electronic key; the detection device being positioned on the frame and connected to the processing unit.

8. The station according to claim 1, comprising two independent guards as rear covers of the first and, respectively, the second portions of the frame; each of the two independent guards being configured to allow removal from the frame.

9. The station according to claim 8, wherein a lower one of the two independent guards includes a compartment which can be opened for accessing components covered by the lower one of the two independent guards.

10. The station according to claim 1, wherein the screen comprises, alternatively or complementarily, a part of the functions of the device for introducing commands to the processing unit.

11. The station according to claim 10, wherein the screen is a touch-screen screen.

* * * * *